US008630200B2

(12) United States Patent
St. Jean et al.

(10) Patent No.: US 8,630,200 B2
(45) Date of Patent: Jan. 14, 2014

(54) METHOD AND APPARATUS FOR EMBEDDING INFORMATION IN A SHORT URL

(75) Inventors: James D. St. Jean, Francestown, NH (US); David Brunette, Manchester, NH (US)

(73) Assignee: Meltwater News International Holdings, GmbH, Schaffhausen (CH)

( * ) Notice: Subject to any disclaimer, the term of this patent is extended or adjusted under 35 U.S.C. 154(b) by 439 days.

(21) Appl. No.: 13/117,817

(22) Filed: May 27, 2011

(65) Prior Publication Data

US 2011/0295990 A1    Dec. 1, 2011

Related U.S. Application Data

(60) Provisional application No. 61/350,083, filed on Jun. 1, 2010.

(51) Int. Cl.
*H04L 12/28*    (2006.01)
*H04J 1/16*    (2006.01)

(52) U.S. Cl.
USPC ........................ 370/252; 370/282; 370/389

(58) Field of Classification Search
USPC ..................................... 370/252, 389, 282
See application file for complete search history.

(56) References Cited

U.S. PATENT DOCUMENTS

| 6,073,135 | A  | 6/2000  | Broder et al. |
| 6,345,307 | B1 | 2/2002  | Booth |
| 6,598,051 | B1 | 7/2003  | Wiener et al. |
| 6,957,224 | B1 | 10/2005 | Megiddo et al. |
| 7,333,801 | B2 | 2/2008  | Chandhok |
| 7,539,776 | B1 | 5/2009  | Saare et al. |
| 7,698,347 | B2 | 4/2010  | Vidya Sagar |
| 7,908,317 | B2 | 3/2011  | Musson |
| 7,921,097 | B1 | 4/2011  | Dandekar et al. |
| 2002/0107986 | A1 | 8/2002 | Pfohe et al. |
| 2004/0199762 | A1 | 10/2004 | Carlson et al. |
| 2007/0168560 | A1 | 7/2007 | Alkire |
| 2011/0196731 | A1* | 8/2011 | Christie et al. ............. 705/14.26 |

* cited by examiner

*Primary Examiner* — John Pezzlo
(74) *Attorney, Agent, or Firm* — McLane, Graf, Raulerson & Middleton, Professional Association

(57) ABSTRACT

A uniform resource locator (URL) encoding system and method are provided for embedding message information in a compressed URL includes associating a link identifier with a first URL, the first URL identifying a target web page. A message identifier representative of at least one message parameter is generated and the link identifier and the message identifier are combined using a reversible pairing function to generate a first combined identifier, the first combined identifier in a first base number system. The first combined identifier is converted to a second combined identifier in a second base number system which is greater than the first base number system. The second URL is generated using the second combined identifier.

25 Claims, 6 Drawing Sheets

METHOD AND APPARATUS FOR EMBEDDING INFORMATION IN A SHORT URL

CROSS-REFERENCE TO RELATED APPLICATION

This application claims the benefit of priority under 35 U.S.C. §119(e) to U.S. provisional application No. 61/350,083 filed Jun. 1, 2010. The aforementioned provisional application is incorporated herein by reference in its entirety.

BACKGROUND

The present disclosure relates generally to so-called compressed URLs or short URLs and, more particularly to systems and methods for embedding message or tracking information within Internet links (Uniform Resource Locators, or URLs) and, in a more limited aspect, to systems and methods that allow encoding and optimization of short URLs that contain one or more tracking identifiers.

The Internet, which started in the late 1960s, is a vast computer network consisting of many smaller networks that spans the entire globe. The Internet has grown exponentially, and millions of worldwide users ranging from individuals to corporations now use permanent and dial-up connections to access the Internet on a daily basis. The computers or networks of computers connected within the Internet, known as "hosts," allow access to databases containing information in nearly every field of expertise and are supported by entities ranging from universities and government to many commercial organizations.

The information on the Internet is made available to the public through "servers." A server is a computer system running on an Internet host for making available files, documents, or other information contained within that host. An Internet server may distribute information to any computer that requests the files on a host. The computer making such a request is known as the "client," which may be an Internet-connected workstation, home personal computer (PC), a software application running on another server, or other types of Internet-connected devices including mobile phones and the like.

The World-Wide Web (Web) is a method of accessing information on the Internet which allows a user to navigate the Internet resources intuitively, without Internet Protocol (IP) addresses or other technical knowledge. The Web is made up of hundreds of thousands of interconnected "pages," or documents, which can be displayed on a computer monitor. The Web pages are provided by hosts running special software called Web servers. Software which runs these Web servers is relatively simple and is available on a wide range of computer platforms including PC's. Equally available is a form of client software, known as a Web "browser," which is used to display Web pages as well as traditional non-Web files on the client system, such as video files or audio files.

Hidden behind certain text, pictures or sounds are connections, known as "hyperlinks" or "hypertext links" (referred to herein generally as "links" and, unless specifically stated otherwise, without regard to fine distinctions or nuances in meaning), which point to other pages within the same server or even on other computers within the Internet. For example, links may be visually displayed as words or phrases that may be underlined or displayed in a second color. Each link is directed to a web page by using a special name called a Uniform Resource Locator (URL). URLs enable a Web browser to go directly to any file or resource held on any Web server. A user may also specify a known URL by putting it directly into the navigational area of a web browser.

Any document or resource designed to be accessed and over the Web and displayed in a web browser is referred to herein as a web page. Each web page must have an address in a recognized format, i.e., the URL or Uniform Resource Locator, that enables computers all over the world to access it. Each web page has a unique URL. Increasingly, URLs are also being used by other software applications to access data hosted on a particular server. The data returned from these URLs is intended to be accessed and read by other computer programs rather than by web browsers. Resources exposed by a server for the benefit of other software applications are called "Web services" and are increasingly used to make Application Programming Interfaces (APIs) available to other software applications on the Internet.

The Uniform Resource Locator is a standard way to specify the location of a resource available electronically. A URL specifies all the information necessary to access a given web page or resource. URLs have a very specific syntax and follow a defined format, such as that specified in RFC 1738.

SUMMARY

In one aspect, a uniform resource locator (URL) encoding method for embedding message information in a compressed URL includes associating a link identifier with a first URL, the first URL identifying a target web page. A message identifier representative of at least one message parameter is generated and the link identifier and the message identifier are combined using a reversible pairing function to generate a first combined identifier. The first combined identifier is in a first number system base. The first combined identifier is converted to a second combined identifier in a second base number system which is greater than the first base number system. The second URL is then generated using the second combined identifier.

In another aspect, a computer system configured to embed message information in a compressed URL includes a processor and a memory in electronic communication with the processor. Instructions stored in the memory are executable to associate a link identifier with a first URL identifying a target web page; generate a message identifier representative of at least one message parameter; combine the link identifier and the message identifier using a reversible pairing function to generate a first combined identifier in a first base number system; convert the first combined identifier to a second combined identifier in a second base number system greater than the first base number system; and, generate the second URL using the second combined identifier.

In a further aspect, a computer system configured to embed message information in a compressed URL includes means for associating a link identifier with a first URL, the first URL identifying a target web page; means for generating a message identifier representative of at least one message parameter; means for combining the link identifier and the message identifier using a reversible pairing function to generate a first combined identifier, the first combined identifier in a first base number system; means for converting the first combined identifier to a second combined identifier, the second combined identifier in a second base number system which is greater than the first base number system; and, means for generating the second URL using the second combined identifier.

In yet another aspect, a non-transitory computer-readable storage medium is provided, comprising executable instructions for associating a link identifier with a first URL, said first URL identifying a target web page; generating a message identifier representative of at least one message parameter; combining said link identifier and said message identifier using a reversible pairing function to generate a first combined identifier, said first combined identifier in a first base number system; converting said first combined identifier to a second combined identifier, said second combined identifier in a second base number system which is greater than the first base number system; and generating the second URL using said second combined identifier.

One advantage of the system and method of the present disclosure is that it requires less storage space than current techniques.

Another advantage of the present system and method resides in its ability to be used for more efficient and effective tracking of recipient-specific and/or message specific click information for a given long or uncompressed URL that is distributed.

Yet another advantage of the presently disclosed system and method is that it allows for channel distribution information to be available within the unique short URL code.

Still a further advantage of more limited embodiments of the presently disclosed system and method resides in the fact that, it may be used to optimize the number of characters used to be as low as possible by generating and comparing multiple Short URL encoding methods to identify an optimal selection. In such limited embodiments, the present disclosure allows for simultaneously identifying the short URL code as being of the specially encoded format, such that the data representative of the particular encoding method or algorithm employed to generate the Short URL self-contained within the Short URL itself.

Other benefits and advantages of the present disclosure will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

The systems and methods in accordance with the present disclosure may operate as software that runs on one or more computer information processing systems connected as servers on the Internet. Each physical server consists of a combination of computer hardware and software working together and connected to the Internet via a computer network interface. It will be recognized that the various functional modules, databases, etc., may be implemented on common hardware, such as a single server, or, alternatively, could be implemented on multiple servers linked via a network, such as a local area network (LAN) or a wide area network (WAN), such as the Internet.

At the hardware level, each system would normally and minimally incorporate a central processing unit (CPU), random access memory (RAM), input/output controllers, hard disk(s), and one or more network communications interface adapters. A typical computer as used in an information processing system is shown in FIG. 1.

Figure 1:
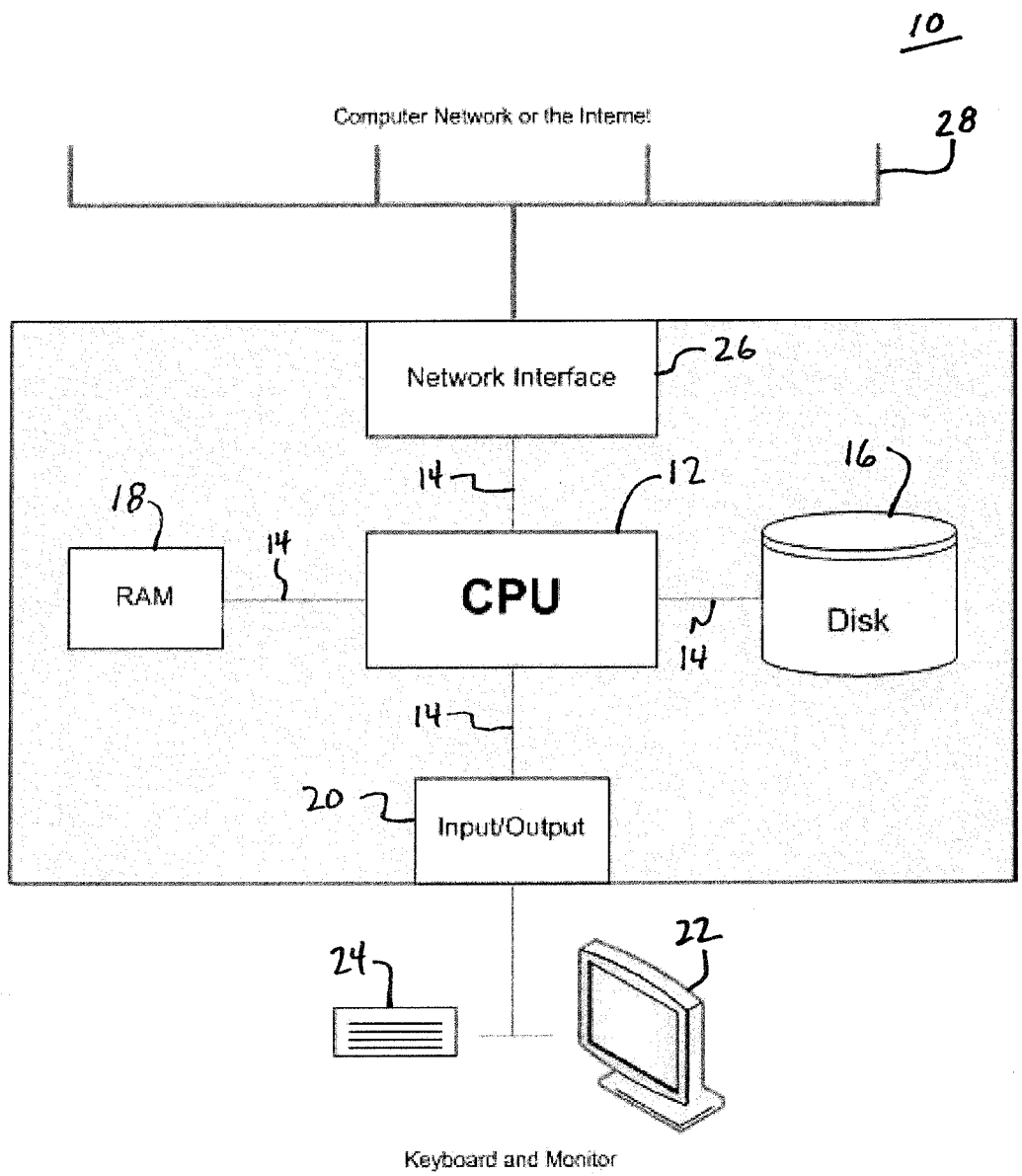
FIG. 1 depicts a typical computer as used in an information processing system.

Referring to FIG. 1, a computer information processing system 10 of a type which is operable to embody the present invention is shown. The computer system 10 shown in FIG. 1 is generally representative of the hardware architecture of a computer-based information processing system capable of hosting the present system. The computer system configurations may vary slightly depending on whether they are purposed as client, server, or other network computer system configurations. The computer hardware is controlled by a central processing unit (CPU) 12. The central processing unit includes a microprocessor or microcontroller for executing programs, performing data manipulations and controlling the tasks of the computer system 10.

Communication with the central processor 12 and the other components is implemented through a system bus 14 that can transfer information among the components of the system, represented by the lines connecting the components in the diagram. The bus 14 may include a data channel for facilitating information transfer between storage and other peripheral components of the hardware system. The bus further provides the set of signals required for communication with the central processing system including a data bus, address bus, and control bus. The bus may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

Other components of the hardware system include main memory 18, and may further include auxiliary memory such as video memory, cache memory, and so forth. The memory (RAM) 18 provides storage of instructions and data for programs executing on the central processing unit. The memory is typically semiconductor-based memory such as dynamic random access memory (DRAM) and/or static random access memory (SRAM). Other semi-conductor-based memory types include, for example, synchronous dynamic random access memory (SDRAM), double data rate (DDR) SDRAM, Rambus dynamic random access memory (RDRAM), ferro-electric random access memory (FRAM), and so on.

The memory components may also include auxiliary memory such as read-only memory (ROM), programmable read-only memory (PROM), erasable programmable read-only memory (EPROM), electrically erasable programmable read-only memory (EEPROM), or flash memory (block oriented memory similar to EEPROM). The computer system may also include an auxiliary disk or similar memory based storage device 16, including but not limited to hard disk, magnetic tape, drum, floppy disk, optical laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well.

The computer system may optionally include an auxiliary processing components which may include one or more input/output processors, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The computer system further includes input/output components, such as input/output adapter 20 allowing the computer 10 to be connected to output devices such as a display device 22 and input/output (I/O) components such as a keyboard 24, mouse, or other peripheral devices, via the system bus 14. The display output system may comprise a video display adapter having all of the components for driving the display device, including video memory, buffer, and graphics engine as desired. The actual display device may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high-gain emissive display (HGED), and so forth.

The computer system further includes a network interface 26 for connecting the computer system 10 to a computer network 28. The computer interface 26 operates as an input/output gateway specific to the transportation of data to other computers within the network 28. The network interface 26 may interface to any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection. The network interface 26 may also include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a cellular digital packet data (CDPD) link, a Research in Motion, Limited (RIM) duplex paging type device, a Bluetooth radio link, or an IEEE 802.11-based radio frequency link. The network interface 26 may further include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

The input/output system 20 and/or the network interface 26 may comprise one or more of various types of controllers or adapters for providing interface functions between the one or more general purpose I/O devices. For example, the input/output system may comprise a serial port, parallel port, integrated device electronics (IDE) interfaces including Parallel AT attachment (PATA), Serial ATA (SATA), IDE, enhanced IDE (EIDE), and the like, small computer system interface (SCSI) including SCSI-1, SCSI-2, SCSI-3, ultra SCSI, fiber channel SCSI, and the like, universal serial bus (USB) port, IEEE 1394 serial bus port, infrared port, printer adapter, radio-frequency (RF) communications adapter, universal asynchronous receiver-transmitter (UART) port, etc., for interfacing between corresponding I/O devices such as a keyboard, mouse, track ball, touch pad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system and I/O devices may provide or receive analog or digital signals for communication between the hardware system of the present disclosure and external devices, networks, or information sources.

The input/output system, I/O devices, and network interface components preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system of FIG. 1 by one having ordinary skill in the art would not depart from the scope or the spirit of the present disclosure.

Figure 2:
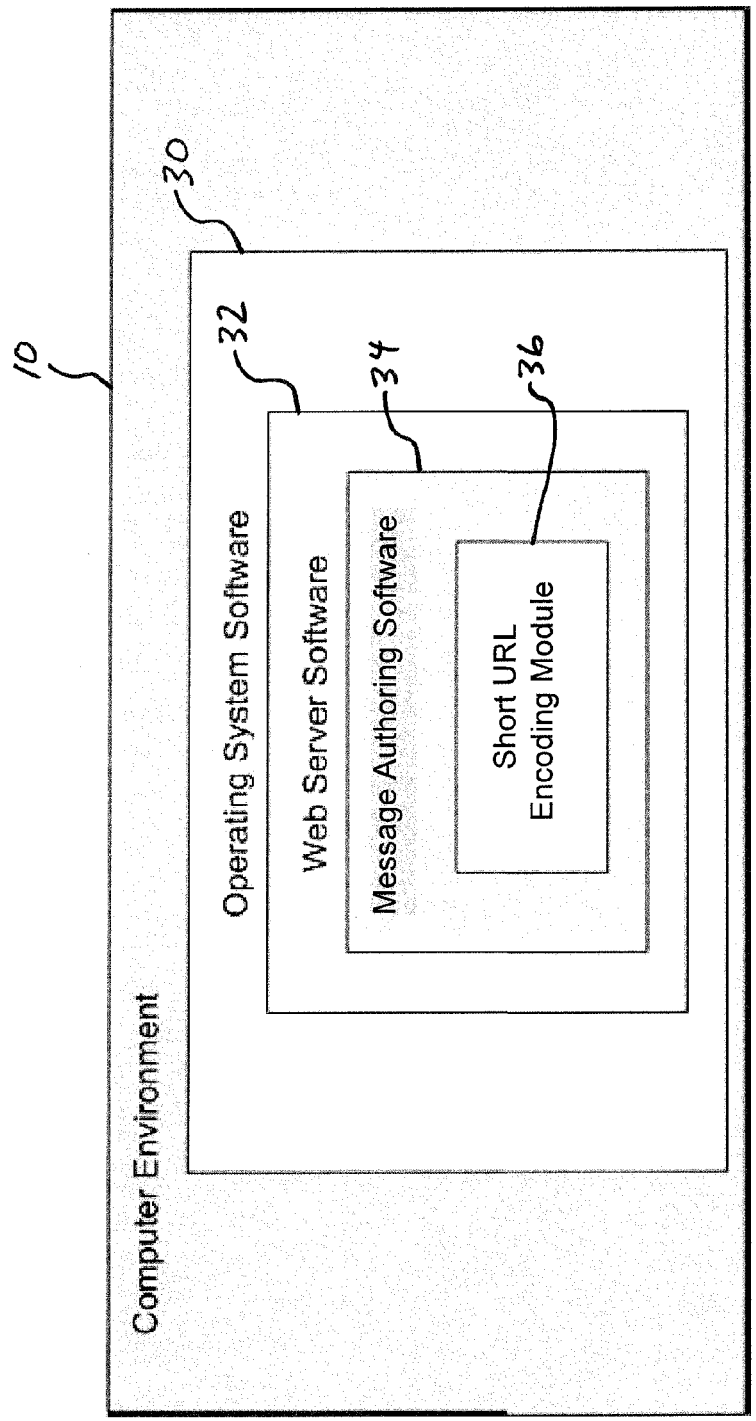
FIG. 2 illustrates software components of a typical computer system capable of hosting the present system.

Referring now to FIG. 2, which illustrates the software components of a typical computer system capable of hosting the present system, the system in accordance with the present disclosure operates as a component within software that runs on the computer hardware environment of each computer processing system, which may be of the type shown in FIG. 1.

At the software level, each computer system 10 typically runs an operating system 30 including drivers for the various hardware components, and one or more applications. Examples of typical operating system software used by such systems would be UNIX, Linux, OS/X, Microsoft Windows, and similar operating systems, which may be commercially available or custom built.

Application software 32 would include the web server software that implements Internet/World Wide Web communication standards and protocols such as HyperText Transfer Protocol (HTTP) or RFC 2068, Javascript Object Notation (JSON) or RFC 4627, and similar established standards. Web server software may include components such as Apache, Internet Information Server, Lighttp, IBM HTTP Server, JRun, and similar servers along with optional add-ons, components, plug-ins, or related modules such as PHP, Perl, Ruby, and the like. The system may host other software applications and components including monitoring applications, database servers such as MySQL, Oracle, or SQL Server, administration tools, and other software components that may connect to or run independently of the software components or modules which embody the short URL generation and decoding functions in accordance with this disclosure.

The short URL encoding module 36 may operate as a functional component within a software application 34 providing other functionality. The encoding of short URLs in accordance with this teaching may advantageously be employed in connection with message authoring or marketing software 34, such as JITTERJAM® software available from JitterGram, Inc., of Bedford, N.H. It will be recognized, however, that the present development could also operate as standalone software application or may be incorporated within application software 34 used for different purposes.

Figure 3:
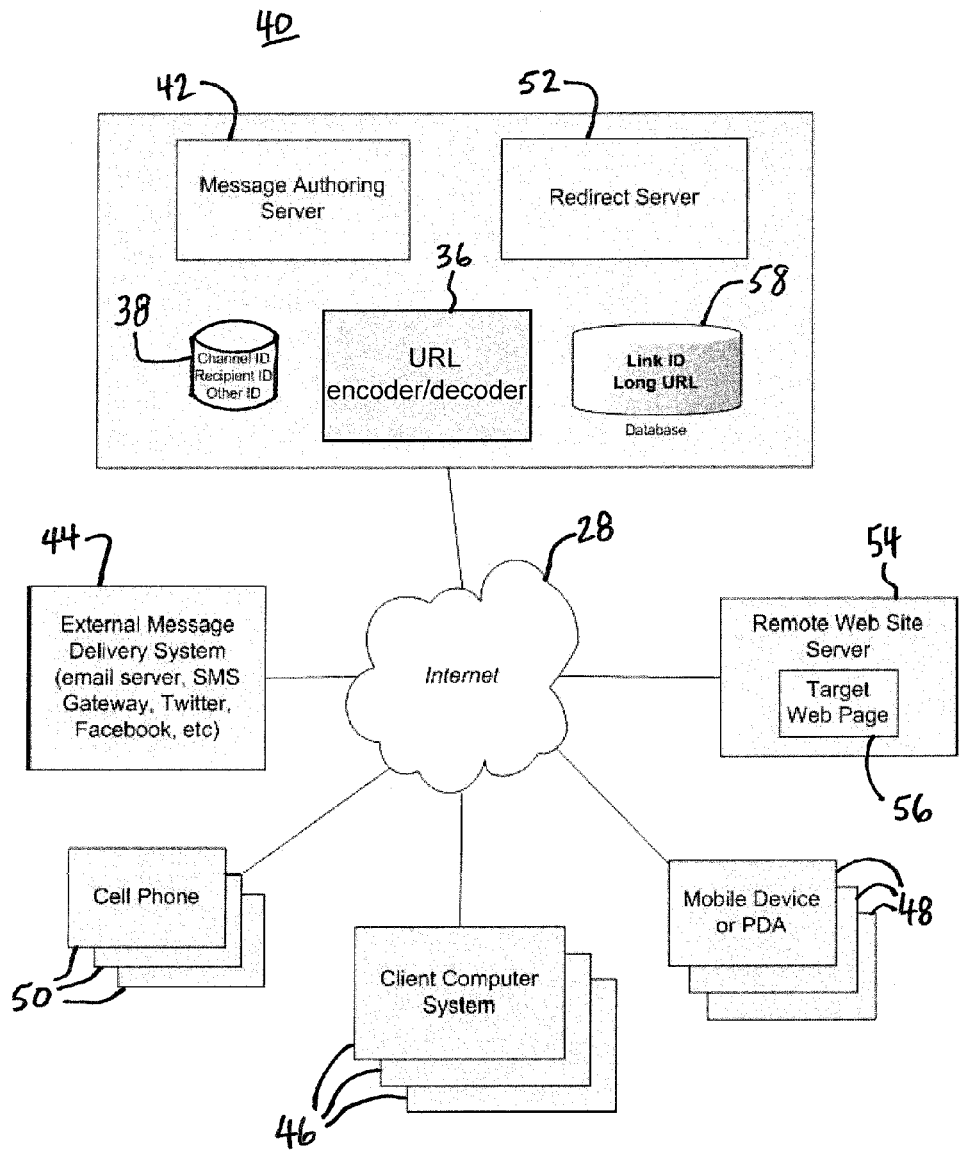
FIG. 3 illustrates an exemplary networked computer environment employing the present system.

Referring now to FIG. 3, there appears a typical networked computer environment 40. Within the networked computer environment 40 as illustrated in the depicted preferred embodiment, there is shown five main computer systems which are connected to each other via the network 28 (typically the Internet, although private networks are also contemplated) and which participate in various ways during the execution lifecycle of the present system and method. Those five participants are shown in FIG. 3 and include (1) a Message Authoring Server 42 which uses the URL encoder/decoder 36; (2) an External Message Delivery System 44; (3) one or more Client Computer Systems 46, PDAs, mobile devices, etc. 48, cell phones 50, and so forth; (4) a Redirect Server 52 which uses the URL encoder/decoder 36; and (5) a Remote Web Site System 54, which hosts the remote or target web page 56. It will be recognized, however, that other configurations are possible. For example, the various functionalities or modules of the present system, such as the message authoring server 42 Short URL encoder (36), Short URL decoder (36), redirect server 52, and a database 58 as shown in FIG. 3 appear as components or functional modules of a computer information handling system 60 sharing common hardware (such as a server having a hardware configuration as shown generally in FIG. 1). However, it will be recognized that any one or more components could be remotely located from the other, for example, configured to communicate via the network 28 and/or other network connection such as a LAN, WAN, the Internet, an intranet, or other communications interface.

The basic interaction between these systems is more specifically described as follows. The message authoring server 42 desires to distribute a message containing a link or URL to one or more recipients (e.g., one or more client computer systems 46, mobile devices or PDAs 48, cell phones or smart phones 50, etc.). The URL or link to be included with the message points to the target web page 56 hosted by the remote web site server 54. The message authoring server 42 prepares the message and encodes the URL of the remote web page 56, as well as other information, as a short URL using the URL encoder/decoder 36 in accordance with this disclosure. The message authoring server 42 then initiates distribution of the message containing the short URL in place of the first URL (e.g., the original long URL) to one or more recipients (e.g., recipients 46, 48, and/or 50, etc.) using the external message delivery system 44. The external message delivery system 44 may be, for example, an email server, an SMS text message or MMS message gateway, a Twitter or Facebook or other social media messaging system, or the like. The external message delivery system 44 distributes the message and short URL to the recipient's client computer systems (46) and/or devices (48, 50).

Preferably, the short URL is encoded within the message as a hyperlink such that when each recipient reads the message, they have the option to follow the short URL (e.g., by selecting, clicking on, pointing to, touching, etc., the short URL) using their web browser or equivalent to visit the remote web site. In operation, following the short URL does not immediately lead the user's browser to display the remote web site 54. Instead, the short URL is encoded such that it first directs the user's browser to the redirect server 52. The redirect server 52 received the short URL request and utilizes the URL encoder/decoder 36 components to decode the embedded information within the Short URL and retrieve information about the URL of the remote web page 56 from the database 58. After processing the embedded information contained in the short URL, the redirect server 52 automatically, and preferably transparently, redirects the user's browser to the appropriate remote web site server 54 to retrieve the remote web page 56.

One advantage of the preferred embodiment systems and methods herein is that it allows the tracking of customer click behavior within "short URLs" distributed over the Internet. The use of short URLs is generally known for the replacement of long URLs that appear within messaging environments that involve limited messages lengths, such as SMS or MMS messages or Twitter messages. Key attributes of short URLs are the need to utilize the minimum possible number of characters within the URL identifying data, such as "http://jit.ly/ABCD."

It is helpful to understand what is unique about the present development by looking at current techniques used to create short URLs and track short URL click information on the Internet.

A short URL is a special form of Internet URL that utilizes a very small number of characters, making it suitable for use in messaging environments that have limited numbers of text characters, such as Short Message Service (SMS) text messages typical on cell phones, or short messages sent through Twitter and similar services. Increasingly, short URLs are also showing up in higher capacity messaging environments to increase the readability of messages that include URLs. Example services that provide such short URL features include http://bit.ly, http://shorturl.com, and http://tinyurl.com.

In order to work properly, short URL services must track a long URL for each short URL. When a user clicks on the short URL, the short URL service looks up the associated long URL and redirects the user to the longer URL. The user does not know they have been redirected to a longer form of the URL. Typically, the short URL service will also count the number of "clicks" each short URL received, and collect other information.

A typical existing technique for generating a short URL to distribute on the Internet is to assign a long URL a unique ID (such as a numerical ID) and creating a record or association between the long URL and the unique ID within a database. The unique ID may then be encoded using a base numbering system higher than 10. For example, encoding it using the digits A-Z would translate the unique ID from a base 10 number to a base 26 number, thereby reducing the number of digits required to represent the unique ID number. This makes the URL "short." Later, when someone clicks on the shortened URL, the high-base number is reconverted to a base 10 number, and the resultant unique ID is used to look up the proper original long URL stored with it, and redirect the user to it.

A primary attribute of existing strategies is they encode each short URL object into one and only one identifier. Meaning, each long URL is associated with a single short URL object or record, and each short URL object is uniquely encoded into one identifier that is distributed over the Internet.

This is represented by the following example:
Consider a long URL: http://www.example.com/subpage/page/123 ?param=xyz
When this long URL is shortened, a short URL object or record is created of the form:

| Short URL ID | Long URL |
| --- | --- |
| 1234 | http://www.example.com/subpage/page/123?param=xyz |

The short URL object or record may also include other data stored with the short URL object, such as click counts.

To create the actual short URL to distribute on the Internet, the unique short URL object or record ID value of 1234, which is a base 10 number, may be converted to a higher base number, such as base 26, using a conversion function. A base 26 conversion is possible, for example, by using A-Z as valid characters of a base 26 number format. This would result in a base 26 form of the number being "AUL" where A represents $1*26^2$, U represents $21*26^1$, and L represents $12*26^0$. The sum of these numbers is 1234 in base 10 notation. The number of digits required to represent the short URL object has been reduced from 4 to 3. By increasing the base value beyond 26 (for example by allowing for both capital and small letters, or a base 52 character set), the number of digits can be reduced further.

The present disclosure will describe some exemplary encoding algorithms in greater detail below, which will primarily be described with reference to the presently preferred embodiments employing base 62 conversion, e.g., which allows using a character set consisting of lower case characters a-z, upper case characters A-Z and numerical characters 0-9, that is, a case-sensitive alphanumerical character set. It will be recognized, however, that any base greater than 10 can be employed, including without limitation, base 16 (for example, using standard hexadecimal notation), base 26 (e.g., using a case-insensitive alphabetical character set), base 36 (e.g., using a case-insensitive alphanumerical character set), base 52 (e.g., using a case-sensitive alphabetical character set), and so forth.

Currently, in practice, for each long URL that one might wish to distribute, a new short URL is created, encoded to be as small as possible, and distributed over the Internet. For each long URL, there is one short URL object, and one associated shortened URL identifier created and distributed. Using the existing methods, if one desires to distribute short URLs to multiple recipients, and track each of them independently (for example, to know exactly which recipients clicked on the URL), multiple short URL objects and records must be created, shortened, and distributed. In practice this can be very inefficient when the same long URL is going to be distributed to a known group of recipients, inasmuch as separate short URL objects and identifiers must be created for each recipient, creating potentially thousands or even tens of thousands of short URL records or objects containing the same long URL.

In order to overcome the limitations of existing approaches and methods, the present inventors have developed unique and novel implementations to allow the distribution of short URL links to a virtually unlimited number of recipients while only requiring the creation and storage of a single short URL object or record. An explanation of the presently preferred techniques or methods now follows.

The approach in accordance with this disclosure may utilize one or more encoding methods to build short URLs containing multiple unique identifiers, which may include, for example, a link identifier and one or more additional identifiers. The present disclosure describes three separate embodiments; however, other embodiments are contemplated as well. Briefly, in certain embodiments, the short URL may be encoded by either the first or second embodiment described below. The third embodiment, discussed below, generates short URLs by both the first and second embodiments, compares the result encoded URLs and selects the shortest to arrive at an optimal result. All three embodiments build a unique encoded short URL for every message recipient while requiring the storage of only a single underlying short URL object or record. The use of additional or alternative encoding methods is also contemplated.

The resulting short URL produced by all of the methods in accordance with this disclosure contains all of the unique identifier information in an encoded form, along with a method identifier that specifies the appropriate method to use to decode the short URL and obtain back the original identifiers, including the link ID. Each of the embodiments is now described separately.

Figure 4:
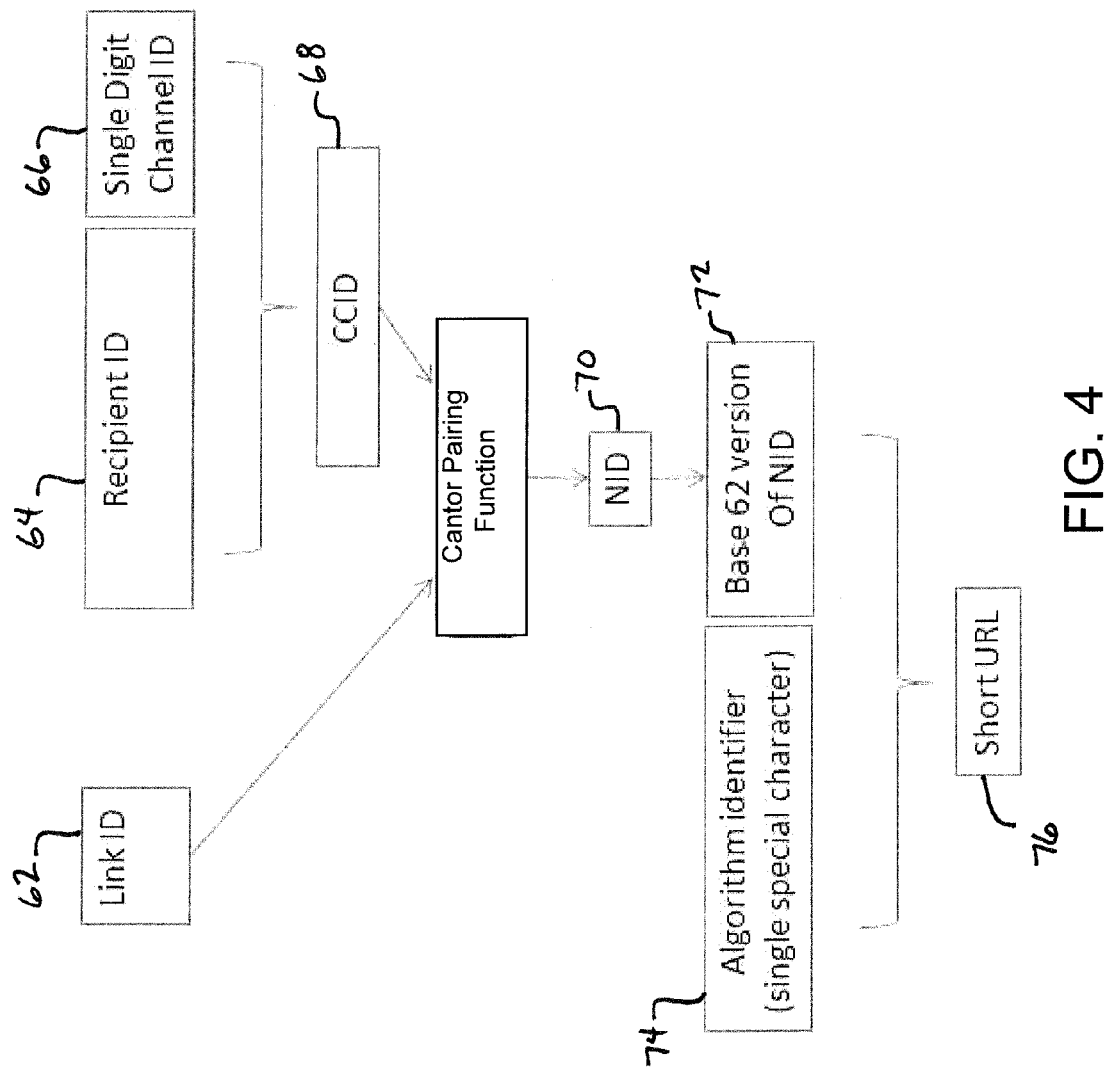
FIG. 4 illustrates a first exemplary process or method for generating a short URL.

Referring now to FIG. 4, there is illustrated a first embodiment Short URL encoding method, wherein the message parameter information to be encoded includes both message recipient information and message transmission channel information. It will be recognized that in alternative embodiments the message parameter to be embedded could be one or the other of message recipient information and message transmission channel information. In other embodiments, one or more additional message parameters which is desired to be tracked could be embedded in place of or in addition to the recipient and channel information.

Still referring to FIG. 4, for each long URL, a unique Link ID 62 is assigned and associated with the long URL in the database 58 (see FIG. 3). Likewise, each recipient (e.g., each recipient in an e-mail list, listsery or other electronic or online content subscribers, and so forth) is assigned a unique Recipient ID 64. A Channel ID 66 is assigned to each message channel or medium. Preferably, the Channel ID is a single digit to minimize the length of the resulting Short URL, although it is contemplated that a multiple digit Channel ID could be used, e.g., where the number of channels for distributing messages containing the encoded Short URL will exceed 10. Preferably, the Link ID, Recipient ID, and Channel ID all base 10 integers.

The Channel ID 66 and the Recipient ID 64 are combined by the encoder/decoder module to produce a new value (CCID) 68. In the simplest embodiment, wherein the recipient ID and channel ID is always known, or, in the case that either or both of the parameters are unknown, some predetermined value for each may be utilized as being representative of "unknown recipient" or "unknown channel" such that the CCID 68 may be generated by merely appending the channel ID 66 to the recipient ID 64 a prespecified location. In the depicted embodiment, the recipient ID 64 appears on the left and the channel ID 66 appears on the right, although in alternative embodiments the order could be reversed. As used herein the term "unknown" with respect to a message parameter such as channel ID or recipient ID is intended to include not only the situation where one or both of such values are literally unknown, but also the case where it is simply not desired to embed such information in the Short URL Referring now to FIG. 6 there is depicted a flow chart outlining an exemplary method or process 100 for generating the CCID 68 for embodiments wherein either or both of the recipient ID 64 and Channel ID are optional or otherwise may be unspecified. At step 104, it is determined whether the message transmission channel is specified. Again, the message channel may be unspecified for a number of reasons, for example, because it is unknown at the time the Short URL is being generated, because it is not desired to track responses (i.e., Short URL clicks by the recipient) based on channel ID for the particular message, etc. If the channel is not specified at step 104, the process continues to step 108 wherein a special character or digit that represents unknown channel is assigned as the value for the Channel ID 66. If the channel is specified at step 104, then the process continues to step 112 wherein the value representative of the message channel for the message that will contain the Short URL is assigned as the value for the Channel ID 66.

The process 100 then proceeds to step 116, wherein it is determined whether the recipient is to be specified. If the recipient is not to be specified at 116, again either because the recipient is unknown or otherwise not desired to be encoded or tracked, the process proceeds to step 120 wherein the CCID 68 is set to equal the Channel ID 66 and the process ends. Otherwise, if the recipient is to be specified at 116, the process proceeds to step 124 and the CCID 68 is set to the Recipient ID corresponding to the message recipient appended with the Channel ID 66 (i.e., Recipient ID on the left and the Channel ID on the right, in the embodiment illustrated in FIG. 4), and the process ends.

It is preferred at step 120 to omit the Recipient ID in cases when the Recipient is not to be specified, rather than assign some value representative of an "unknown" recipient because it reduces the size of the number being encoded in cases where a Recipient ID is not present. It will be recognized, however, that in alternative embodiments, a special value representative of unknown recipient could be assigned to the Recipient ID if desired. Likewise, the process 100 could be modified such that a values representative of "unknown" could be assigned to the Recipient ID where the recipient is unknown and the Channel ID omitted from the CCID when the Channel ID is unknown. However, this is less preferred, since it is believed that having an unknown recipient will likely be a more common occurrence than unknown channel, thereby resulting in a smaller number to be encoded, which, in turn, would tend to produce shorter compressed URLs in more cases.

Figure 6:
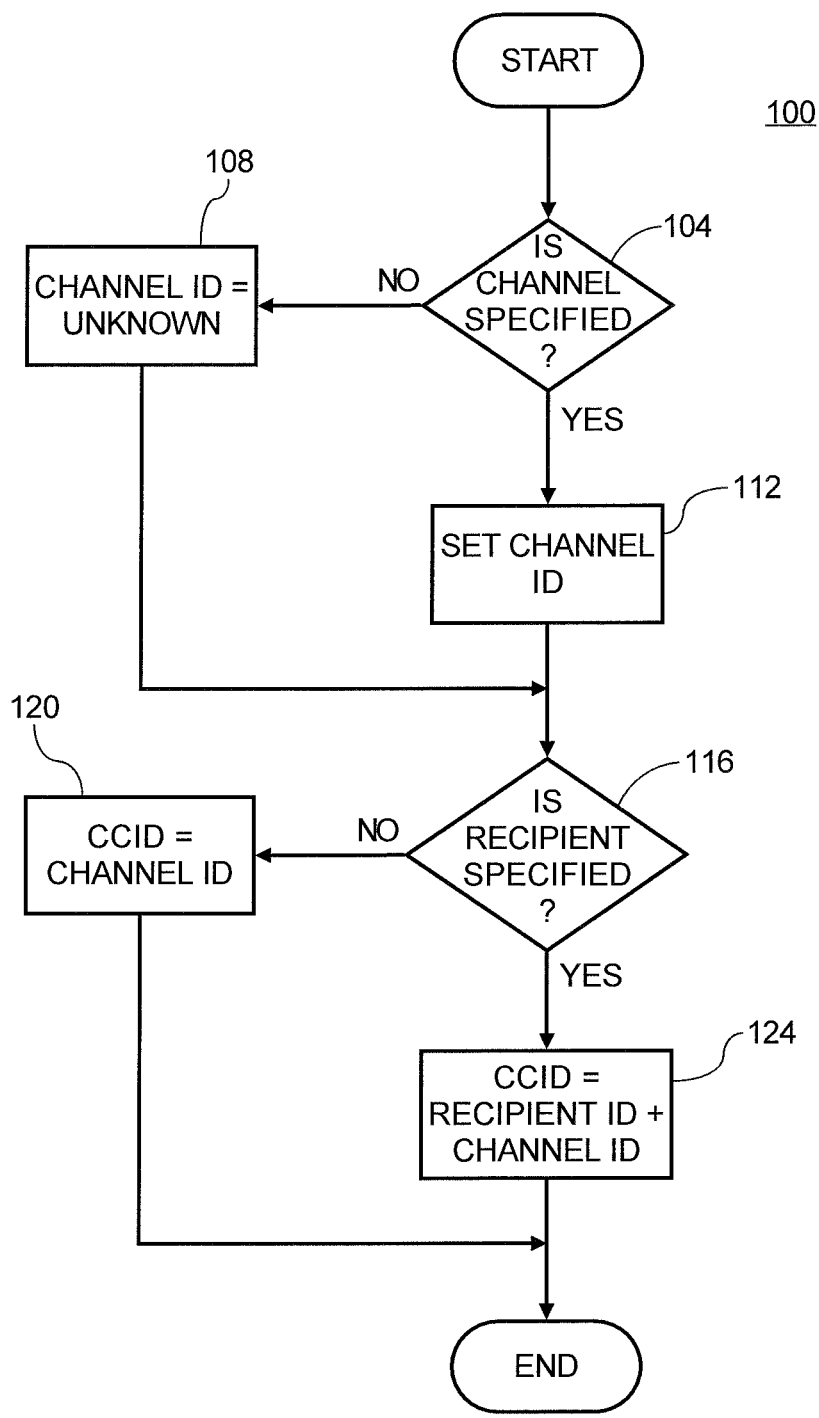
FIG. 6 illustrates an exemplary method for generating a combined recipient and channel identifier (CCID) for each unique combination of message recipient and message channel.

When the encoder/decoder module 36 later decodes a Short URL that utilizes a CCID 68 that has been generated using the process 100 outlined in FIG. 6, the module 36 first checks to detect the situation when the Recipient ID 64 has been left out of the original encoding of the CCID 68. For example, the encoder/decoder module 36 may examine the number of digits in the CCID 68 after reversing the pairing function described below, e.g., the in the case where the Channel ID 66 is always a single digit or some other prespecified number of digits or characters.

Referring again to FIG. 4, the Link ID 62 and the CCID 68 are combined using a 2:1 encoding algorithm, such as a Cantor Pairing function (see, e.g., http://en.wikipedia.org/wiki/Cantor_pairing_function#Cantor_pairing_function) to produce a single new integer value (NID) 70. The Cantor Pairing function is an example of a function that converts two integer numbers into a single resultant integer number, and allows the process to be later reversed, converting a single integer back into the original two source integers. It is possible to substitute alternative functions that have this capability (such as bit interleaving or others) and use them instead of the Cantor Pairing function.

The NID 70 is then encoded to a higher base (preferably base 62) version 72 of the NID by converting from base 10 to the higher base. Optionally, the higher base version 72 is annotated with an algorithm identifier 74 (e.g., a special character) to identify the URL as having been encoded using this embodiment to generate the Short URL 76. Note that this algorithm identifier annotation step is optional (and preferably omitted for the sake of making the Short URL shorter) for any applications wherein this first embodiment is the only encoding method employed. Where the algorithm identifier 74 is not used, the higher base version 72 of the NID is used as the Short URL 76. In the depicted embodiment, the algorithm identifier 74 (if used) is appended to this higher base version 72 as a prefix, but could alternatively be appended as a trailing character as well.

Preferably, the algorithm identifier 74, if used, is selected from a character that is not in the character set used to represent the base 62 (or other higher base) encoded number 72. However, it is possible that the algorithm identifier digit 74 could be a character that is a part of the higher base encoding character set, e.g., wherein the algorithm identifier 74 is always appended at a prespecified position within the encoded short URL 76, e.g., the leading digit or the trailing digit. Alternatively, the encoding algorithm identifier character 74 could be appended to the Short URL 76 at a prespecified position within the Short URL data field using a special character delimiter, although this is less desirable as it increases the length of the Short URL as compared to appending the encoding algorithm identifier directly at a predetermined location within the Short URL.

It will be recognized that the order of the various components as illustrated in FIG. 4 is exemplary only and that other orders can be employed. For example, the order of the Recipient ID 64 and the Channel ID 66 could be reversed, the Algorithm Identifier 74 and the higher base version 72 of the NID could be reversed, the special algorithm identifier character 74 could be appended as the trailing character, etc.

The Short URL 76 is then appended with the protocol (e.g., http://) and the domain and top-level domain of the redirect server 52. It will be recognized that a subdomain (e.g., www.) may also may be used, although for the purpose of shortening the URL, a short URL redirect server 52 will preferably be configured without a subdomain.

Figure 5:
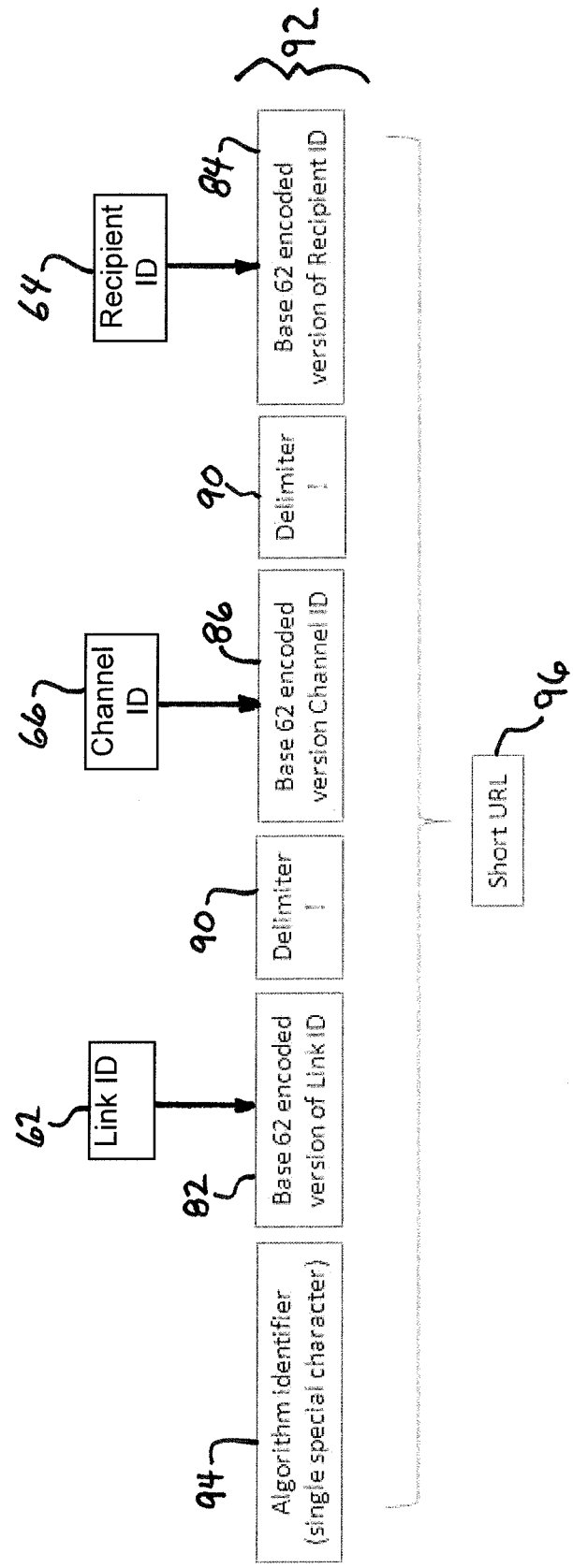
FIG. 5 illustrates a second exemplary process or method for generating a short URL.

Referring now to FIG. 5, there appears a second embodiment Short URL encoding method herein which, while more along the lines of the traditional approach, unlike the prior art approach, also allows the separate encoding of the values for the Recipient ID 64, the Channel ID 66 along with the Link ID 62. In this second embodiment, the Link ID 62, Channel ID 66, and Recipient ID 64 are each individually encoded using a higher base (e.g., preferably base 62 although other bases greater than 10 are contemplated) to yield the respective higher base versions 82, 84, and 86.

The encoder 36 and then appends the high base Link ID 82, high base Channel ID 86, and high base Recipient ID 84 results using delimiter characters 90 to create a delimited string 92. The delimited string 92 is used in conjunction with the protocol, domain, and top-level domain of the redirect server 52 to generate a Short URL 96. It will be recognized that any delimiter character may be employed to generate the delimited string 96, so long as it is not a part of the character set used to represent the base 62 encoded values 82, 84, and 86.

It will be recognized that in embodiments where the Channel ID 66 is a single character (such as a base 10 integer less than 10), it is not necessary to encode the Channel ID 66 since doing so will not result in shortening the Short URL 96. In such alternative embodiments, the encoding and decoding module 36 will read the Channel ID 66 directly from the Short URL 96 based on its position in the delimited string 92.

The delimited string 92 generated in this fashion may optionally have appended thereto a special character prefix (or, alternatively, suffix) 94 to identify the URL as having been encoded using this second embodiment method. Again, the special character is preferably a character that is not a part of the character set used to represent higher-base encoded numbers, although this is not required in cases where the algorithm identifier is always present as a prespecified position within the Short URL.

Appending the special character 94 to identify the encoding method or algorithm can be omitted for embodiments that employ this second embodiment as the only encoding method. Alternatively, the encoding algorithm identifier character could be appended to the Short URL at a prespecified position within the Short URL data field using a special character delimiter 90, although again, this is less preferred as it increases the length of the Short URL as compared to appending the encoding algorithm identifier directly at a predetermined location (e.g., as leading character in the depicted embodiment) within the string 96. It will be recognized that the order of the various components as shown in FIG. 5 is exemplary and that any other order or arrangement of the various components comprising the Short URL may be employed.

A third embodiment method is an aggregate approach that employs the method for the first and second embodiments detailed above and selects the most effective based on the number of characters in the resultant short URL. In this third embodiment, for example, both of the first and second embodiments described above are used to generate potential short URLs 76 (FIG. 4) and 96 (FIG. 5). These short URLs 76 and 96 are then compared based on their size, and whichever resultant Short URL is the shortest (i.e., fewest characters) is selected and used in place of the long URL by the message authoring software in the message distributed to the recipient. In this third embodiment, the algorithm identifier 74, 94 is appended to the corresponding Short URL 76, 96, respectively, to identify to the encoder/decoder module 36 which method was used to create the selected Short URL.

With each of the embodiments, the encoding process is repeated for each unique recipient and distribution channel of the message, utilizing the same Link ID 62 value, but successively variable Recipient ID 64 and Channel ID 66 values. This results in a unique short URL value (76, 96) for every designated link/recipient/channel combination. Interestingly, it is possible that different individual recipients will receive the same message with a Short URL encoded using different methods.

When a user, e.g., message recipient, clicks on the URL containing a unique short URL, in embodiments such as the third embodiment in which the Short URL 76, 96 may be encoded by a method selected from among multiple algorithms, the encoder/decoder module 36 first identifies the method that was used based on the special character 74 or 94. The Short URL is then decoded by the encoder/decoder module 36, reversing the designated encoding method and any associated calculations to get back the unique original values for each of Link ID 62, Recipient ID 64, and Channel ID 66. These identifiers are then used to record, e.g., in the database 58 or a separate database or data log 38 on the computer system 60, the fact that somebody clicked on the link associated with the Link ID 62 and identify the recipient to whom the link was originally sent, and the original channel of distribution.

The techniques described here can be further extended to incorporate additional methods for generating a Short URL, wherein each additional method is assigned a unique special Algorithm Identifier (preferably the leading character in the short URL, although other placements within the Short URL are contemplated), which is used by the decoder module 36 to identify the associated method by which the Short URL was generated for the purpose of reversing the encoding method to reconstitute the Link ID 62 and associated Recipient ID 64 and Channel ID 66. When the number of Short URL encoding methods exceeds the number of available special characters, the scheme can be extended to utilize multiple special characters in succession, e.g., by using two-character or multi-character algorithm identifiers.

The presently disclosed systems and methods may advantageously be used with a marketing application that allows businesses to send messages to customers or consumers (or potential customers or consumers) over one of several or many distribution channels, such as email, SMS message, MMS Message, Twitter, Facebook, and so forth. By using the techniques described here, the marketing application can efficiently and effectively distribute different short URLs to customers or consumers in a much more efficient and effective manner than was previously possible with established techniques. An exemplary lifecycle of using the systems and methods herein is as follows:

1. A marketer wants to distribute content of interest or a marketing message to one or more customers that use different channels (e.g., email, Twitter, Facebook, SMS, MMS, etc) for communication. This content includes one or more Internet URLs (long URLs).

2. Using the authoring software 34 (see FIG. 2), the marketer authors its message and the encoding software 36 generates one or more specially encoded short URLs using one or more of the Short URL encoding embodiments described above.

3. The software, such as the message authoring software 34 (or the marketing software incorporating or otherwise associated with or used in conjunction with the message authoring software 34), then initiates delivery of the messages to the recipients, which messages contain the short URLs in place of long URLs.

4. One or more recipients follow (e.g., click on) the short URL(s) contained within the message they receive. This directs their web browser or mobile device to follow the link to the redirect server 52, thereby causing the encoder/decoder module 36 to be invoked to handle processing of the short URL.

5. In embodiments wherein a Short URL is generated using multiple methods and the shortest one is selected, the software module 36 recognizes or identifies the particular encoding method used the generate Short URL using the algorithm identifier and decodes the Short URL by reversing the identified encoding method to reproduce the original channel ID 66, recipient ID 64, and link ID 62. In embodiments wherein a single encoding method is used (e.g., either the first or second embodiment encoding method as described above), then the software module 36 simply decodes the Short URL to reproduce the original channel ID 66, recipient ID 64, and link ID 62. This decoded information, such as Link ID, Channel ID, and Recipient ID in the illustrated preferred embodiment can be logged in the database 58 or other database, data store, table, file, etc. 38.

6. The software, e.g., the redirect server 52, records events associated with knowing that the indicated customer clicked on the identified link and that this link was originally delivered over the indicated channel, e.g., in the database or data store 38.

7. The redirect server 52 then retrieves the long URL associated with the Link ID 62 from the database 58 and automatically redirects the user to the remote server 54 to retrieve the target web page 56 identified by the original long URL.

Some of the presently preferred aspects of the invention are contemplated as follows. In certain aspects, a method and system for encoding a short URL algorithm identifier within a short URL, e.g., as a leading or trailing character or characters, is contemplated. In a further aspect, a method and system for using a plurality of algorithms to generate a plurality of Short URL corresponding to a long URL and then selecting a single Short URL from the plurality based on some predetermined criteria, such as the shortest, is provided. In still another aspect, a method and system for combining link ID, recipient ID, and channel ID data (and/or any other desired data) within a single short URL is provided. In yet a further aspect, a system and method employing a pairing function, such as a Cantor Pairing function or the like to encode recipient identifier data and link identifier data as a component of a short URL is provided. In still another aspect, a system and method are provided for distributing an unlimited number of different short URLs, all of which are associated a common long URL to a virtually unlimited number of individual recipients and across multiple communication channels, while requiring the storage of the short URL ID/long URL pair or association only once.

EXAMPLES

A summary of test results for 14 comparative sample inputs comparing the first, second, and third embodiments as described above are presented in Table 1, below.

without appending an encoding algorithm identifier), in preferred embodiments, Embodiment 3 is employed. Based on the test results above, Embodiment 3 is preferred, wherein Embodiment 1 generates the resulting Short URL in most cases, but wherein Embodiment 2 is left as an optimization for the edge cases. Thus, Embodiment 3 provides the best result (e.g., the shortest URL) being selected in all cases.

In the depicted preferred embodiment described above, the special character "!" was used as the algorithm identifier for Embodiment 1 and the special character "-" was used as the algorithm identifier for Embodiment 2. It will be recognized that, in alternative embodiments where multiple possible short URLs are generated and the shortest one selected, it is also possible to prespecify a "default" encoding algorithm, wherein the algorithm identifier character can be omitted for Short URL's generated by this predetermined default algorithm, wherein the Short URL decoder module uses the absence of a special encoding algorithm identification character in the Short URL to determine that the encoding method was the default method. In other embodiments, however, it is also contemplated that a default algorithm identifying character be used in all Short URLs, e.g., to allow the redirect server 52 to distinguish not only between Short URLs encoded by different methods, but also to distinguish between short URL's and long or non-encoded URLs.

Certain embodiments of the present systems and methods herein can be implemented as sets of instructions resident in the main memory of one or more computer systems. Until required by the computer system, the set of instructions may be stored in another computer readable memory such as a hard disk drive or in a removable memory such as an optical disk for utilization in a DVD-ROM or CD-ROM drive, a magnetic media for utilization in a magnetic media drive, a magneto-optical disk for utilization in a magneto-optical drive, or a memory card for utilization in a card slot. Further,

TABLE 1

|  | Link ID | Recipient ID | Channel ID | Embodiment 1 | Embodiment 2 | Embodiment 3 | Embodiment 3 Result URL |
|---|---|---|---|---|---|---|---|
| Case 1 | 2459 | 55555 | 3 | !0pLddzs | -mn!z!6Tz | !0pLddzs | http://jit.ly/!0pLddzs |
| Case 2 | 555555 | 55555 | 3 | !4usZoJc | -09Mj!z!6Tz | !4usZoJc | http://jit.ly/!4usZoJc |
| Case 3 | 555555 | 100 | 3 | !0pzi4iF | -09Mj!z!yF | !0pzi4iF | http://jit.ly/!0pzi4iF |
| Case 4 | 20000 | 1000 | 1 | !STcuG | -r5D!y!73 | !STcuG | http://jit.ly/!STcuG |
| Case 5 | 12345 | 6789 | 8 | !zhvy51 | -zgW!3!yqh | !zhvy51 | http://jit.ly/!zhvy51 |
| Case 6 | 1234567 | 6789 | 8 | !6wuQd5m | -rk4c!3!yqh | !6wuQd5m | http://jit.ly/!6wuQd5m |
| Case 7 | 1 | 2 | 3 | !rg | -y!z!0 | !rg | http://jit.ly/!rg |
| Case 8 | 99999 | 2 | 3 | !rTMwP1 | -BZv!z!0 | !rTMwP1 | http://jit.ly/!rTMwP1 |
| Case 9 | 554433 | 2000 | 11 | !rZGrWSi | -096f!k!M7 | !rZGrWSi | http://jit.ly/!rZGrWSi |
| Case 10 | 10000 | 2000 | 11 | !N1BMjx | -0l8!k!M7 | !N1BMjx | http://jit.ly/!N1BMjx |
| Case 11 | 9876543219 | 3 | 3 | !L2w28Ccs6HA | -4HNU1k!z!z | -4HNU1k!z!z | http://jit.ly/-4HNU1k!z!z |
| Case 12 | 9876543219 | 0 | 3 | !L2w2g9xE4T7 | -4HNU1k!z | -4HNU1k!z | http://jit.ly/-4HNU1k!z |
| Case 13 | 9876543219 | 1 | 1 | !L2w26p5wLSN | -4HNU1k!y!y | -4HNU1k!y!y | http://jit.ly/-4HNU1k!y!y |
| Case 14 | 987654321 | 1 | 1 | !DyPVnmnik4 | -y1J2Zd!y!y | -y1J2Zd!y!y | http://jit.ly/-y1J2Zd!y!y |

Looking at these results, in most typical cases, Embodiment 1 results in short URL values that are from 1-3 characters shorter than Embodiment 2. It is only for certain input data sets, e.g., where the link ID value is in the billion+range that the delimited string Embodiment 2 results in a shorter resultant URL value. And in those cases, it is only shorter in the presence of very low Recipient ID values. Therefore, Embodiment 1 results in a substantial and meaningful reduction in short URL size in most cases. Although embodiments using only a single Short URL encoding method are contemplated, e.g., either a pairing method such as Embodiment 1 or a method using delimiters such as Embodiment 2 (with or the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically, or holographically, so that the medium carries computer readable information.

The invention has been described with reference to the preferred embodiments. Modifications and alterations will occur to others upon a reading and understanding of the preceding detailed description. For example, additional or alternative encoding methods or algorithms could be used to combine the unique identifiers into a single short URL. Alternative identity data fields could be encoded into the Short URL in addition to or instead of the recipient ID and channel ID. Exemplary alternative or additional data fields could be, for example, a unique communication ID, source document ID, lead source ID, campaign ID, or any other unique ID or set of IDs that are relevant to the given circumstances and context. In further embodiments, the Short URL encoding strategy of this disclosure could be combined with encryption of the data prior to or after encoding. In still other embodiments, added value or supplementary processing could be added to the action of clicking through a link. For example, each time a consumer clicks a link, that consumer record is updated, or some follow-on action is automatically triggered using workflow. It is intended that the invention be construed as including all such modifications and alterations.

Having thus described the preferred embodiments, the invention is now claimed to be:

1. A uniform resource locator (URL) encoding method for embedding message information in a compressed URL, said method comprising:
    associating a link identifier with a first URL, said first URL identifying a target web page;
    generating a message identifier representative of at least one message parameter;
    combining said link identifier and said message identifier using a reversible pairing function to generate a first combined identifier, said first combined identifier in a first base number system;
    converting said first combined identifier to a second combined identifier, said second combined identifier in a second base number system which is greater than the first base number system; and
    generating the second URL using said second combined identifier.

2. The method of claim 1, wherein said at least one message parameter is selected from one or both of: (a) a first value representative of a recipient of a message to be sent to the recipient; and (b) a second value representative of a transmission channel of the message to be sent to the recipient.

3. The method of claim 2, further comprising:
    associating a recipient identifier with the recipient of the message to be sent to the recipient;
    associating a channel identifier with the transmission channel of the message to be sent to the recipient;
    wherein said message identifier is generated by reversibly combining said recipient identifier and said channel identifier.

4. The method of claim 3, wherein said channel identifier is a single digit and said message identifier is generated by appending said channel identifier to said recipient identifier.

5. The method of claim 1, wherein said link identifier and said message identifier are base 10 integers.

6. The method of claim 1, wherein the first base numbering system is base 10 and the second base numbering system is selected from the group consisting of base 26, base 52, and base 62.

7. The method of claim 1, wherein the second URL is generated by adding URL designations for protocol, domain, and top-level domain to said second combined identifier.

8. The method of claim 7, wherein the protocol is a hypertext transfer protocol.

9. The method of claim 1, wherein the first URL is an uncompressed URL.

10. The method of claim 1, further comprising:
    prior to generating said second URL, appending said second combined identifier with a first special character representative of a first decoding algorithm.

11. The method of claim 10, further comprising:
    generating a third URL using said link identifier, recipient identifier, and said channel identifier;
    comparing a number of characters in said second URL with a number of characters in said third URL to determine which of the second URL and the third URL has the fewest number of characters; and
    inserting the one of the second URL and the third URL that has the fewest number of characters into the message to be sent to the recipient.

12. The method of claim 11, wherein said third URL is generated by:
    converting said link identifier from a third base number system to a compressed link identifier in a fourth base number system which is greater than the third base number system;
    converting said recipient identifier from the third base number system to a compressed recipient identifier in the fourth base number system;
    converting said channel identifier from the third base number system to a compressed channel identifier in the fourth base number system;
    generating a delimited character string combining said compressed link identifier, said compressed recipient identifier, and said compressed channel identifier;
    appending said delimited character string with a second special character representative of a second decoding algorithm to generate an appended delimited character string; and
    generating the third URL using said appended delimited character string.

13. A computer system configured to embed message information in a compressed URL, said computer system comprising:
    a processor;
    a memory in electronic communication with the processor; and
    instructions stored in said memory, the instructions being executable to:
        associate a link identifier with a first URL, said first URL identifying a target web page;
        generate a message identifier representative of at least one message parameter;
        combine said link identifier and said message identifier using a reversible pairing function to generate a first combined identifier, said first combined identifier in a first base number system;
        convert said first combined identifier to a second combined identifier, said second combined identifier in a second base number system which is greater than the first base number system; and
        generate the second URL using said second combined identifier.

14. The computer system of claim 13, wherein said at least one message parameter is selected from one or both of: (a) a first value representative of a recipient of a message to be sent to the recipient; and (b) a second value representative of a transmission channel of the message to be sent to the recipient.

15. The computer system of claim 14, wherein the instructions are further executable to:

associate a recipient identifier with the recipient of the message to be sent to the recipient;

associate a channel identifier with the transmission channel of the message to be sent to the recipient;

wherein said message identifier is generated by reversibly combining said recipient identifier and said channel identifier.

16. The computer system of claim 15, wherein said channel identifier is a single digit and said message identifier is generated by appending said channel identifier to said recipient identifier.

17. The computer system of claim 13, wherein said link identifier and said message identifier are base 10 integers.

18. The computer system of claim 13, wherein the first base numbering system is base 10 and the second base numbering system is selected from the group consisting of base 26, base 52, and base 62.

19. The computer system of claim 13, wherein the instructions are further executable to generate the second URL by adding URL designations for protocol, domain, and top-level domain to said second combined identifier.

20. The computer system of claim 19, wherein the protocol is a hypertext transfer protocol.

21. The computer system of claim 13, wherein the first URL is an uncompressed URL.

22. The computer system of claim 13, wherein the instructions are further executable to append said second combined identifier with a first special character representative of a first decoding algorithm prior to generating said second URL.

23. The computer system of claim 22, wherein the instructions are further executable to:

generate a third URL using said link identifier, recipient identifier, and said channel identifier;

compare a number of characters in said second URL with a number of characters in said third URL to determine which of the second URL and the third URL has the fewest number of characters; and insert the one of the second URL and the third URL that has the fewest number of characters into the message to be sent to the recipient.

24. The computer system of claim 23, wherein the instructions are further executable to generate said third URL by:

converting said link identifier from a third base number system to a compressed link identifier in a fourth base number system which is greater than the third base number system;

converting said recipient identifier from the third base number system to a compressed recipient identifier in the fourth base number system;

converting said channel identifier from the third base number system to a compressed channel identifier in the fourth base number system;

generating a delimited character string combining said compressed link identifier, said compressed recipient identifier, and said compressed channel identifier;

appending said delimited character string with a second special character representative of a second decoding algorithm to generate an appended delimited character string; and generating the third URL using said appended delimited character string.

25. A computer system configured to embed message information in a compressed URL, said computer system comprising:

means for associating a link identifier with a first URL, said first URL identifying a target web page;

means for generating a message identifier representative of at least one message parameter;

means for combining said link identifier and said message identifier using a reversible pairing function to generate a first combined identifier, said first combined identifier in a first base number system;

means for converting said first combined identifier to a second combined identifier, said second combined identifier in a second base number system which is greater than the first base number system; and means for generating the second URL using said second combined identifier.

* * * * *